| United States Patent [19] | [11] 3,725,327 |
|---|---|
| Stearns et al. | [45] Apr. 3, 1973 |

[54] ZINC DI(LOWER ALKYL) DITHIOCARBAMATES AS MOLD INHIBITORS FOR LATEX PAINTS

[75] Inventors: Milo E. Stearns; Wilbur S. Taylor, both of Westport, Conn.

[73] Assignee: R. T. Vanderbilt Company, Inc., New York, N.Y.

[22] Filed: Nov. 16, 1970

[21] Appl. No.: 90,114

[52] U.S. Cl....................260/29.6 MM, 260/17 R, 260/29.6 MQ, 260/45.75 R
[51] Int. Cl. .............................................C09d 5/14
[58] Field of Search...260/29.6 MM, 29.6 MQ, 17 R, 260/45.75 R; 106/15 AF; 424/27

[56] References Cited
UNITED STATES PATENTS

| 3,215,660 | 11/1965 | Bryan et al. | 260/29.6 MM |
|---|---|---|---|
| 3,239,475 | 3/1966 | Clark | 260/29.6 MM |
| 3,259,643 | 7/1966 | Nash | 260/429 |
| 3,386,951 | 6/1968 | Pauli et al. | 260/29.6 MQ |
| 3,586,520 | 6/1971 | Dillon | 106/15 AF |

*Primary Examiner*—William H. Short
*Assistant Examiner*—L. M. Phynes
*Attorney*—Kenyon & Kenyon Reilly Carr & Chapin, Robert D. Fier and Alan T. Bowes

[57] ABSTRACT

Zinc dimethyldithiocarbamate, when incorporated in latex paint in sufficient amount, inhibits the growth of mold on the paint film obtained upon drying of the paint.

10 Claims, No Drawings

ZINC DI(LOWER ALKYL) DITHIOCARBAMATES AS MOLD INHIBITORS FOR LATEX PAINTS

This invention relates to mold inhibitors for latex paints. More particularly, this invention relates to the use of zinc dimethyldithiocarbamate as a mold inhibitor for latex paints.

Water-thinned paints based upon emulsions, latexes or dispersions of synthetic, film-forming polymers in water have become well established, especially in the house paint field. Because films of such paints are prone to the growth of mold, which causes discoloration, disfigurement and blemishing of the film surface, and ultimately loss of adhesion of the paint film to the substrate, mold inhibitors are incorporated into latex paints, especially those intended for exterior use. Use of an additive as a mold inhibitor is to be distinguished from its use as a can preservative. Additives used only as can preservatives are intended to prevent bacterial attack of the liquid paint on storage, rather than mold growth on the dry paint film, and are employed in much smaller amounts than additives used as mold inhibitors. Thus can preservatives are normally employed at concentrations of not more than one-tenth of the concentrations at which mold inhibitors are employed.

To be useful as a mold inhibitor, the additive must meet a number of criteria. In particular, it must be active against mold-forming fungi while in the dry paint film, it must be stable while present in the liquid paint and to the conditions encountered in use, it must remain in the paint film without being leached out or evaporating, and it must not discolor the paint. Since more white exterior paints are used than any other color, this last criterion is a difficult one to satisfy.

To date, the most satisfactory mold inhibitors for latex paints have been organo-mercury compounds. Although these compounds have been found to be effective and stable and do not discolor the paint, they suffer from numerous drawbacks. The major disadvantage of these materials is their high toxicity to warm-blooded animals, thus posing a health hazard to workers during preparation and application of the paint, as well as to any person who might eat flakes of dried paint. Moreover, the organo-mercury compounds are volatile, and can evaporate from the paint film. In addition, the organo-mercury compounds react with sulfides to form mercury sulfides, causing severe paint discoloration, they may react with the metal in paint cans, causing possible failure of the can, they are not readily dispersed throughout the latex paint, and they are expensive and subject to wide fluctuations in price.

Despite the drawbacks of the organo-mercury mold inhibitors and the expenditure of considerable effort to replace them, no compound has been found prior to this invention that would be an acceptable substitute. For example, many potential candidates are unstable in the aqueous paint formulation, and others are not sufficiently active in the dry paint film. Still others are too highly colored to permit use in white paints or those paints which are only lightly tinted.

It is an object of this invention to provide a mold inhibitor for latex paints.

More particularly, it is an object of this invention to provide a mold inhibitor which does not contain mercury and yet is effective, stable and does not pose a serious problem of paint discoloration.

Another object of this invention is to provide a latex paint suitable for exterior use having a non-mercurial mold inhibitor.

Still another object of this invention is to provide a dry paint film from a latex paint containing a non-mercurial mold inhibitor.

In accordance with this invention, it has been discovered that certain zinc dialkyldithiocarbamates, especially zinc di-methyldithiocarbamate, are effective mold inhibitors for latex paints. They are stable in the latex paint formulation and do not pose a serious discoloration problem. They are relatively non-toxic to humans, and remain in the paint film without evaporation or leaching with water. They are powdery solids, and can be readily incorporated in and dispersed throughout the latex paint. They provide excellent can stability, and are less expensive and less subject to price fluctuation than mercury mold inhibitors. Finally, they act as in-can preservatives against bacteria.

The zinc dialkyldithiocarbamates of interest are the lower alkyl derivatives, i.e., the derivatives having from one to about six carbons in the alkyl groups thereof. Zinc dimethyldithiocarbamate is preferred.

By the term "latex paint," as used herein, is meant a paint comprised of an emulsion, latex or dispersion of a film-forming synthetic resin in water. When paints of this type are applied to a surface in a thin film, water evaporates, the emulsion breaks, and the resin particles coalesce to form a continuous film. Typically these paints also contain pigments, dispersing agents, protective colloids and thickeners, anti-foamers, coalescing agents, freeze-thaw additives and a pH control agent. Still other components may be present. The most common latex paints are those based upon acrylic ester polymers such as polymers of methyl methacrylate and ethyl acrylate, for example a methyl methacrylate/ethyl acrylate/acrylic acid terpolymer, or polyvinyl acetate. The composition of latex paints of this type is well known to those of ordinary skill in the art. (See, e.g., U.S. Pat. No. 3,494,878, the disclosure of which is incorporated herein by reference). Normally, these paints comprise a solids phase dispersed in water wherein the solids content is in the range of from about 20 to about 70 weight per cent of the total wet paint, the balance being water. The essential components of these paints are the film forming resin, which normally constitutes from about 5 to about 25 weight per cent of the wet paint, the pigment, which ordinarily is present in an amount of from about 15 to about 55 weight per cent of the wet paint, and the surfactants which are present in amounts sufficient to maintain the resin and pigment in suspension or emulsion, commonly from about 0.5 to about 5 weight per cent of the wet paint. Still other additives may be present in varying amounts, and may be dispersed or dissolved in the water.

The composition of the latex paints is not critical to this invention. It should be noted, however, that the zinc dialkyldithiocarbamates are of particular utility in alkaline latex paints because of their good stability in alkaline aqueous media.

The concentration of mold inhibitor in the latex paint is not narrowly critical, provided the amount is effective to inhibit the growth of mold on the dried paint film. Typically, the effective concentration will be at least about 1, preferably at least about 2, weight per cent, based upon the weight of the latex paint solids, and thus in the dry paint film. The optimum amount ordinarily will be in the range of from about 4 to about 8 weight per cent, based upon paint solids. Concentrations of greater than about 8 per cent of the paint solids can be employed if desired, but ordinarily are unnecessary to achieve an acceptable level of mold inhibition. Furthermore, concentrations as high as about 16 per cent should not be used in white paints due to discoloration of the paint, although they might be suitable in colored paints.

The zinc dialkyldithiocarbamate can be in any suitable form. A high degree of purity is not required, and technical grade product may be used. Moreover, mixtures with other compounds, for example the synergistic mixtures of zinc dimethyldithiocarbamate and the zinc salt of 2-mercaptobenzothiazole disclosed in U.S. Pat. No. 2,776,922, may be used. It should be noted, however, that presently available data do not indicate that such synergistic mixtures possess any significant advantage over zinc dimethyldithiocarbamate alone in latex paints. Indeed, because the benzothiazole salt is more highly colored than the carbamate salt, such mixtures are less desirable from the standpoint of paint discoloration.

The zinc dialkyldithiocarbamates are incorporated into the paint in any convenient fashion. Since they can be in the form of powdery, water-insoluble solids, they are readily mixed into the formulation by techniques similar to those employed in mixing in the paint pigments, and it is generally convenient to add the zinc dialkyldithiocarbamate with the pigment. The zinc dialkyldithiocarbamate desirably has a particle size such that less than 0.1 per cent is retained on a 325-mesh screen.

The following examples are illustrative:

EXAMPLE 1

An acrylic emulsion paint was prepared by mixing 233 pounds of water, 2.4 pounds of carboxymethyl cellulose, 25 pounds of ethylene glycol, 10 pounds of a polyelectrolyte dispersing agent for aqueous systems (Darvan No. 7; R. T. Vanderbilt Co., Inc.), 4 pounds of an anti-foaming agent (Balab 748; Witco Chemical Corp.), 200 pounds of titaniumdioxide (Rayox R 55S; R. T. Vanderbilt Co., Inc.), and 242 pounds of talc (Nytal 300; R. T. Vanderbilt Co., Inc.) in a high speed mill, and thereafter blending in under slow speed reduction 4 pounds of 28 per cent ammonia and 450 pounds of a 50 per cent solids acrylic latex (Rhoplex AC-388; Rohm & Haas). This formulation yields 100 gallons of paint. Using similar procedures a second paint formulation was prepared containing 80 pounds of zinc dimethyldithiocarbamate. In this formulation the amount of talc was reduced by the volume occupied by the added zinc dimethyldithiocarbamate, which was incorporated into the paint in the initial high-speed mixing step. Portions of the two formulations were blended to provide paint formulations containing 10, 20 and 40 pounds of zinc dimethyldithiocarbamate per 100 gallons.

Each of the paints was applied to ⅛ inch × 4 inch × 8 inch acrylic sheets (Plexiglas) and to wooden tongue depressor panels, both of which had been primed with an oil based primer based on Federal Specification TT-P-25c. Contiguous draw-downs of each test paint and the control (no zinc dimethyldithiocarbamate) were applied to the plastic panels, whereas three coats of the test and control paints were applied by brush to the wooden panels. These panels were then applied to frames for outdoor exposure at 20° from the horizontal, facing south, in Westport, Conn., examined after 5 months for mold growth and rated on a scale of 1 to 10, wherein a value of 10 signifies no mold; a value of 8 signifies slight mold growth; a value of 6 signifies considerable mold growth; a value of 4 signifies heavy growth; and a value of 2 signifies very heavy growth. The exposed paints were also examined for color and the test paints were rated against the control paint. The result of these evaluations are summarized as follows:

| Paint sample | Amount of mold inhibitor, lb.* | Mold growth rating, 5 month's exposure | | Color of paint film** | | |
|---|---|---|---|---|---|---|
| | | Plexiglas draw-down | Tongue depressor | Initial | 1 month's exposure | 5 month's exposure |
| 1 | 80 | 8 | 7 | NC | Sl | Consid. |
| 2 | 40 | 7 | 7 | NC | VSl | Sl. |
| 3 | 20 | 6 | 6 | NC | VSl | VSl. |
| 4 | 10 | 5 | 4 | NC | Tr. | NC. |
| 5 | ¹0 | 4 | 4 | | ←Standard→ | |

¹ Control.
*Pounds per 100 gallons (1,170 pounds).
**NC=No change from standard; Tr.=Trace of color; VSl=Very slight yellowing; Sl=Slight yellowing; Consid.=Considerable yellowing; SV=Severe yellowing.

From the foregoing it is evident that zinc dimethyldithiocarbamate is an effective mold inhibitor in an acrylic latex paint at a level of 20 to 40 pounds per 100 gallons, and that serious discoloration occurs at higher levels.

EXAMPLE 2

The procedures of Example 1 were repeated, except that a mixture of 92 per cent zinc dimethyldithiocarbamate and 8 per cent zinc salt of 2-mercaptobenzothiazole was substituted for the zinc dimethyldithiocarbamate, and the results of these tests are as follows:

| Paint sample | Amount of mold inhibitor, lb. | Mold growth rating, 5 month's exposure | | Color of paint film | | |
|---|---|---|---|---|---|---|
| | | Plexiglas draw-down | Tongue depressor | Initial | 1 month's exposure | 5 month's exposure |
| 1 | 80 | 8 | 8 | NC | Consid. | Consid. |
| 2 | 40 | 7 | 7 | NC | Sl. | Sl. |
| 3 | 20 | 6 | 6 | NC | Tr. | VSl. |
| 4 | 10 | 5 | 5 | NC | NC. | NC. |
| 5 | ¹0 | 4 | 4 | | ←Standard→ | |

¹ Control.

When the data of Examples 1 and 2 are compared it is apparent that the zinc dimethyldithiocarbamate/zinc salt of 2-mercaptobenzothiazole mixture is, in this test, equivalent to or better than the zinc dimethyldithiocarbamate as a mold inhibitor, but tends to impart somewhat more color to the paint on exposure, especially at the higher loadings.

EXAMPLE 3

Employing procedures similar to those described in Example 1, except that the ammonia and the acrylic emulsion were replaced by 9 pounds of water and 448 pounds of a 51 per cent solids polyvinyl acetate emulsion (Everflex BG; Dewey & Almy Chemical Div.), a control polyvinyl acetate latex paint was prepared. A similar paint was prepared containing a loading of 80 pounds of a 92/8 per cent zinc dimethyldithiocarbamate/zinc salt of 2-mercaptobenzothiazole mixture and in which the Nytal 300 was reduced to maintain constant volume. Paint samples at intermediate loadings were obtained by blending the test and control paints in suitable proportions. The results of the evaluations of these paints are as follows:

| Paint sample | Amount of mold inhibitor, lb. | Mold growth rating, 5 month's exposure | | Color of paint film | | |
|---|---|---|---|---|---|---|
| | | Plexiglas draw-down | Tongue depressor | Initial | 1 month's exposure | 5 month's exposure |
| 1 | 80 | 8 | 8 | NC | SV | Consid. |
| 2 | 40 | 7 | 7 | NC | Consid. | Sl. |
| 3 | 20 | 6 | 6 | NC | Tr | VSl. |
| 4 | 10 | 5 | 6 | NC | NC | NC. |
| 5 | ¹0 | 3 | 4 | | ←Standard→ | |

¹ Control.

A comparison of the data for Examples 2 and 3 reveals that the zinc dimethyldithiocarbamate/zinc salt of 2-mercaptobenzothiazole mixture is equally effective in acrylic and polyvinyl acetate latex paints.

When zinc dialkyldithiocarbamates are used in paints containing unsaturated oils as major constituents of the film-forming binder, the drying of some paints may be retarded. This apparent anti-oxidant effect of the zinc dialkyldithiocarbamates may be a most desirable one in some paints since such effect will tend to minimize the over-hardening or possible after-embrittlement of the paint films containing these unsaturated oils.

What is claimed is:

1. A latex paint comprising water, a film forming synthetic resin selected from the group consisting of polymers of methyl methacrylate and ethyl acrylate and polvinyl acetate and a zinc di(lower alkyl)dithiocarbamate in an amount sufficient to inhibit the growth of mold on the dry paint film formed from said paint.

2. A paint according to claim 1 wherein said zinc di(lower alkyl)dithiocarbamate is zinc dimethyldithiocarbamate.

3. A paint according to claim 2 wherein the concentration of said zinc dimethyldithiocarbamate is from about 1 to about 16 weight per cent, based upon total paint solids.

4. A paint according to claim 2 wherein the concentration of said zinc dimethyldithiocarbamate is from about 4 to about 8 per cent, based upon total paint solids.

5. A paint according to claim 2 wherein said zinc dimethyldithiocarbamate is in synergistic admixture with the zinc salt of 2-mercaptobenzothiazole.

6. A dry paint film formed upon drying a latex paint comprising water, a film forming synthetic resin selected from the group consisting of polymers of methyl methacrylate and ethyl acrylate and polvinyl acetate and a zinc di(lower alkyl)dithiocarbamate in an amount sufficient to inhibit the growth of mold on said film.

7. A paint film according to claim 6 wherein said zinc di(lower alkyl)dithiocarbamate is zinc dimethyldithiocarbamate.

8. A paint film according to claim 7 wherein the concentration of said zinc dimethyldithiocarbamate is from about 1 to about 16 weight per cent.

9. A paint film according to claim 8 wherein the concentration of said zinc dimethyldithiocarbamate is from about 4 to about 8 per cent.

10. A paint film according to claim 7 wherein said zinc dimethyldithiocarbamate is in synergistic admixture with the zinc salt of 2-mercaptobenzothiazole.

* * * * *